United States Patent [19]

Jean

[11] Patent Number: 5,450,806

[45] Date of Patent: Sep. 19, 1995

[54] WATERTIGHT AND THERMALLY INSULATING TANK BUILT INTO THE BEARING STRUCTURE OF A SHIP HAVING A SIMPLIFIED CORNER STRUCTURE

[75] Inventor: Pierre Jean, Dampierre, France

[73] Assignee: GAZ Transport, France

[21] Appl. No.: 280,560

[22] Filed: Jul. 26, 1994

[30] Foreign Application Priority Data

Sep. 9, 1993 [FR] France .................. 93 10721

[51] Int. Cl.⁶ .............................................. B63B 25/16
[52] U.S. Cl. .................................. 114/74 A; 220/901; 220/902
[58] Field of Search ............. 114/74 A; 220/901, 902, 220/426, 415, 435, 444

[56] References Cited

U.S. PATENT DOCUMENTS

| 3,399,800 | 9/1968 | Gilles | 114/74 A |
| 4,199,909 | 4/1980 | Kotcharian | 220/901 X |
| 5,269,247 | 12/1993 | Jean | 114/74 A |

FOREIGN PATENT DOCUMENTS

| 0064886B1 | 11/1982 | European Pat. Off. . |
| 0543686A1 | 5/1993 | European Pat. Off. . |
| 2462336 | 2/1981 | France . |
| 2504882 | 5/1982 | France . |
| 2683786 | 5/1993 | France . |
| 2022231 | 12/1979 | United Kingdom . |

Primary Examiner—Sherman Basinger
Attorney, Agent, or Firm—Pollock, Vande Sande & Priddy

[57] ABSTRACT

A watertight and thermally insulating tank built into the bearing structure of a ship. The tank includes a primary watertight barrier contacting a product contained within the tank. A secondary watertight barrier is located between the primary watertight barrier and a bearing structure of the ship. The tank also includes a primary thermal insulating barrier and a secondary thermal insulating barrier. The thermal insulating barriers are alternated with the watertight barriers. A fastener holds the primary thermal insulating barrier pressed against the secondary watertight barrier. A corner connection connects elements of the primary and secondary watertight barriers at a corner of the tank in zones where the transverse bulkheads meet the internal sides of the double hull of the ship at an intersection ridge. The corner connection secures the elements of the watertight barriers to opposite sides of a band along weld lines. The weld lines are substantially parallel. The band is secured to the bearing structure in the vicinity of the intersection ridge.

21 Claims, 4 Drawing Sheets

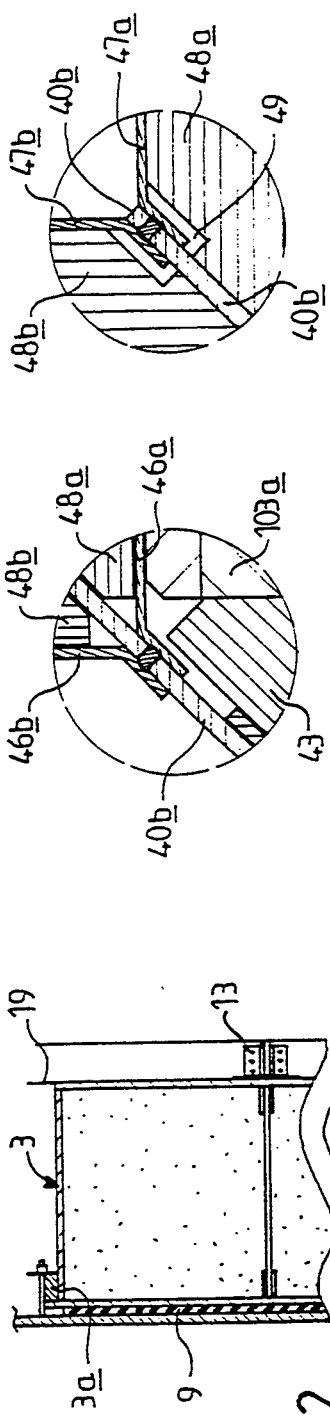
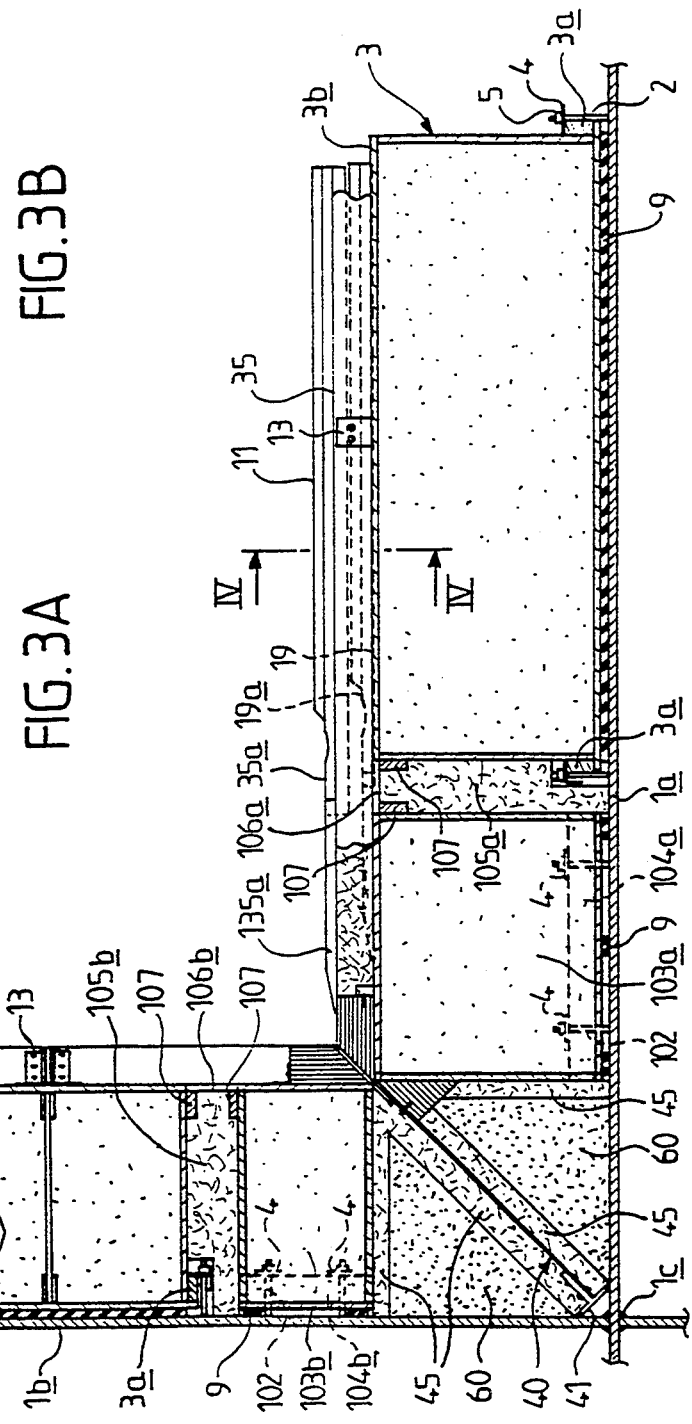
FIG. 3A
FIG. 3B
FIG. 2

WATERTIGHT AND THERMALLY INSULATING TANK BUILT INTO THE BEARING STRUCTURE OF A SHIP HAVING A SIMPLIFIED CORNER STRUCTURE

FIELD OF THE INVENTION

The present invention relates to the production of watertight and thermally insulating tanks intended for the transportation of liquefied gases by sea, and, in particular, to the transportation of liquefied natural gases with a high methane content. It is known that a ship of the type in question is made up of a double hull which, from the strength of materials point of view behaves like a very long girder, the neutral axis of which is closer to the bottom than to the deck. This double hull is internally divided up into several lengths by double transverse bulkheads, each length containing a leaktight and thermally insulating transportation tank.

BACKGROUND OF THE INVENTION

In French Patents 1 438 330, 2 105 710 and 2 146 612, there has already been described the production of a watertight and thermally insulating tank, built into the bearing structure of a ship and made up by two successive watertightness barriers, one being a primary one, in contact with the liquefied gas transported, and the other a secondary one, located between the primary barrier and the bearing structure of the ship, these two watertightness barriers being alternated with two layers of thermal insulation termed "insulating barriers". In these embodiments, the primary and secondary insulating barriers are made up of parallelepipedal compartments filled with a particular insulant and the primary and secondary watertightness barriers are made up of metal strakes, for example made of invar, with turned-up edges welded on either side of a weld flange.

In French Patent 2 504 882, an embodiment of this type of tank is proposed in which the secondary insulating barrier is made up of parallelepipedal compartments filled with insulant and the primary insulating barrier is made up of plates formed of a cellular layer mounted on a rigid panel. The rigidity of the plates of the primary insulating barrier allows better resistance with regard to impacts produced on the walls of the tank by the movements of the liquid during transportation, which movements are due to the rolling and pitching of the ship. Unfortunately, this device exhibits a defect: what happens is that the primary barrier is fastened directly onto the bearing structure of the ship by anchoring members, which pass through the secondary watertightness barrier. Now, it has become apparent that this technique is liable to generate stress concentration zones under certain conditions, which is unfavourable from the safety point of view; what is more, the anchoring members establish a direct thermal bridge between the primary barrier and the bearing structure of the ship, which is unfavourable from the insulation performance point of view.

In French Patent Application 2 683 786, a tank of the type defined hereinabove is described, in which the secondary insulating barrier is made up of a set of heat-insulated compartments, each compartment including, in line with each groove intended for the fitting of a fastening means ensuring that the primary insulating barrier is pressed elastically on the secondary insulating barrier, a thick internal bulkhead fixed to the faces which delimit the compartment, the retaining members employed for holding the secondary insulating barrier on the bearing structure of the ship being, away from the corners of the tank, aligned in line with the grooves in which the fastening means are inserted. According to a technique described previously by the applicant company, the connection corner of the tank walls in the zones where the transverse bulkheads of the ship meet the double hull, was produced in the form of a ring, the structure of which remains constant along the entire length of the ridge of intersection of the said transverse bulkhead with the double hull of the ship. In order to produce a corner formed by the double-hull of the ship and a transverse bulkhead, it was proposed, in this French Patent Application 2 683 786, to fasten two perpendicular anchoring bands joined by L-shaped angle brackets to the two secondary watertightness barriers onto the perpendicular bearing walls by means of a one-way joining piece, the said L-shaped angle brackets being joined together by a joining band perpendicular to the plane bisecting the corner in question, at least one of the two anchoring bands being extended, substantially in its plane, beyond the L-shaped angle bracket which is joined to it, in order to meet the primary leaktightness barrier associated with one of the bearing walls of the corner in question, the primary leaktightness barrier associated with the other bearing wall being connected, by watertight welding of a bracket-shaped strip, to its abovementioned counterpart and, possibly, to the anchoring band situated in its plane.

This embodiment of the tank corners gives satisfaction but corresponds to a relatively high cost price. Furthermore, it is known that when the ship is moving in heavy seas, the deformation of the girder which it constitutes generates very significant tensile stresses at the primary and secondary watertightness barriers which stresses, in fact, add to the tensile stresses generated in these watertightness barriers when the tank is subjected to cold. In the device described in French Patent Application 2 683 786, the take up of these tensile loads is effected substantially in the plane of the primary leaktightness barriers, that is to say at a distance from the intersection ridge of the bearing structure which is equal to the thickness of the primary and secondary insulating barriers together. Although this arrangement does not pose any problems as regards the double hull of the ship it does, in contrast, require that part of the double transverse bulkheads which is close to the intersection ridge to be reinforced. The cost of carrying out this reinforcement adds to the cost due to the complexity of the connecting ring proposed by this French Patent Application 2 683 786 and generates an increase in the cost price of the ship.

SUMMARY OF THE INVENTION

According to the invention, it was sought, on the one hand, to reduce the cost price of producing the tank corners and, on the other hand, to reduce the cost price of the primary and secondary barriers without in any way losing the good insulation and safety characteristics of the prior system described in French Patent Application 2 683 786.

According to the invention, a device is proposed allowing the loads generated by the primary and secondary watertightness barriers in the immediate vicinity of the intersection ridge of a tank corner to be taken up by virtue of an oblique band on which the combination of the loads generated in the tank wall parallel to the double hull and in the tank wall parallel to the transverse bulkhead are exerted. It is appropriate to note that in the prior device of French Patent Application 2 683 786, the connecting ring of a tank corner still included, for the combination of forces in a plane perpendicular to the intersection ridge, a structure with a triangular cross-section embodied by welded plates, and this structure was still located in the space separating the primary watertightness barrier and the secondary watertightness barrier: taking account of the complexity of the structure to be produced, that necessarily involved a minimum thickness of the primary insulating barrier. Now, it is known that it is beneficial, for a constant tank wall thickness, to increase the thickness of the secondary barrier to the detriment of that of the primary barrier, because if there is a leak at the primary watertightness barrier, the accidental cold zone is further from the double hull, the thicker the secondary barrier. Given that, according to the invention, a connecting ring structure is proposed which replaces the abovementioned triangular element by a simple plane band, it becomes possible to reduce the thickness of the primary barrier and the invention proposes, as a consequence, a novel way of fastening the primary barrier to the secondary barrier, reducing the costs by comparison with that which was proposed in French Patent Application 2 683 786.

As a consequence, the subject of the present invention is a watertight and thermally insulating tank, particularly a polyhedral tank, built into the bearing structure of a ship, the said bearing structure including, for each tank, on the one hand, walls which are substantially parallel to the axis of the ship and form the internal sides of its double hull and, on the other hand, two transverse bulkheads substantially perpendicular to the axis of the ship, the said tank including two successive watertightness barriers, one being a primary one in contact with the product contained in the tank and the other being a secondary one located between the primary barrier and the bearing structure of the ship, these two watertightness barriers being alternated with two thermally insulating barriers, the primary insulating barrier being held pressed against the secondary watertightness barrier by means of fastening means located substantially continuously in a straight line and mechanically joined to the secondary insulating barrier, the corner connection of the primary and secondary barrier elements in the zones where the transverse bulkheads meet the internal sides of the double hull being produced in the form of a connecting ring, the structure of which remains substantially constant along the entire length of the intersection ridge of a transverse bulkhead with the internal sides of the double hull, characterized in that, in such a corner connection, the two primary watertightness barriers, on the one hand, and the two secondary watertightness barriers, on the other hand, are secured to each other, on either side of one and the same band along a weld line, the two weld lines being substantially parallel, the mid-plane of the said band pointing, at all points on the ring, so that it passes substantially through the intersection ridge assignable to the connection corner in question, the said band being secured to the bearing structure in a zone close to the said intersection ridge.

In a preferred embodiment of the invention, the band is joined to four plates, two being in the extension of the two primary watertightness barriers of the tank corner, and the other two being in the extension of the two secondary watertightness barriers, these plates, when the connection corner is fitted, being connected by welding to the watertightness barriers by means of intermediate strakes. Provision may be made for inserting insulating flat shims between the plates joined to the band; the insulating shims may be made of wood, particularly plywood; the shims are held with respect to the plates by screws located in the overlap zone of the intermediate strakes.

Advantageously, the band is made up in two parts lap-welded to each other, the second part being joined to the said plates and the first part being joined to the bearing structure; the second part of the band associated with the four plates and with the two shims may constitute a connection ring prefabricated element. The first part of the band may be joined to the bearing structure by means of a T-shaped strap to which it is secured by rivetting which, under load, allows a translational movement of the said first part of the band with respect to the strap, particularly when the secondary insulating barrier is produced from a material with a low bulk modulus leading to its shrinking away elastically under the hydrodynamic load of the cargo. Provision may be made for the first part of the band to be supported, in the zone where it is welded to the second part of the said band, by a tenon carried by an adjacent element forming part of the secondary insulation barrier and for it to be secured to the said tenon by screwing. The volume included, on either side of the band, between the two elements of the secondary insulation barrier which are closest to the intersection ridge of the corner connection in question, is advantageously filled with an insulating material.

The subject of the present invention is also a watertight and thermally insulating tank built into the bearing structure of a ship, the said tank including two successive watertightness barriers, one being a primary one in contact with the product contained in the tank and the other being a secondary one located between the primary barrier and the bearing structure of the ship, these two watertightness barriers being alternated with the two thermally insulating barriers, the primary insulating barrier being held pressed against the secondary watertightness barrier by means of fastening means located substantially continuously in a straight line and mechanically joined to the secondary insulating barrier, the primary insulating barrier being made up of substantially parallelepipedal elements between which the said fastening means pass, characterized in that the primary insulating barrier is held pressed against the secondary watertightness barrier by the primary watertightness barrier itself, the said primary and secondary watertightness barriers being secured to the said fastening means in a watertight fashion.

According to a first embodiment variant, a fastening means comprises three parts, a first part being made up of a first expansion joint held on an element of the secondary insulation barrier and including a weld flange which projects with respect to the face of the secondary insulation barrier supporting the secondary watertightness barrier and which is capable of a translational movement with respect to the secondary insulation barrier, a second part being made up of a batten in a rabbet of which the weld flange of the first joint is positioned, a joining means securing the said flange and the batten, the said batten furthermore including a groove on its opposite face from the one where the rabbet emerges, a third part being made up of a second expansion joint analogous to the first and fitted into the groove in the said batten, the weld flange of the second joint projecting with respect to the face of the primary insulation barrier which supports the primary watertightness barrier, the weld flanges of the two expansion joints respectively, allowing the secondary and primary watertightness barriers to be secured to the fastening means by welding.

According to another embodiment variant in which the elements of the primary insulation barrier are insulating panels of slight thickness, a fastening means is made up of a single expansion joint held on an element of the secondary insulation barrier and including a weld flange projecting with respect to the two faces of the two insulating barriers, which respectively support a watertightness barrier, the said weld flange allowing the secondary and primary watertightness barriers to be secured to the said fastening means, by welding.

In a preferred embodiment of the invention, the secondary insulating barrier is made up of substantially parallelepipedal elements fixed against the bearing structure of the ship by retaining members secured to the said bearing structure, the said elements being separated from one another by substantially straight joint zones where the aforementioned retaining members are located. Advantageously, each retaining member includes, on the one hand, a threaded stud welded by its base onto the bearing structure of the ship and, on the other hand, a nut which bears on a tenon secured to a compartment of the secondary insulating barrier, the said tenon being located along each edge of the compartment parallel to the joint zones close to the bearing structure of the ship. The secondary watertightness barrier may be made up of metal strakes with edges turned up towards the inside of the tank, the said strakes being produced from thin plate with a low coefficient of expansion and being butt-welded, via their turned-up edges, onto the two faces of the weld flange of an expansion joint held mechanically on the secondary insulating barrier.

Provision may be made for the expansion joints, which form part of a fastening means, to be made up, on the one hand, of a first U-shaped fold formed on a longitudinal edge of the weld flange and, on the other hand, of a second U-shaped fold formed on a fixing strip, the two folds being fitted into one another, each fixing strip being fitted and held in a groove made in line with an internal partition of the compartments, the width of the said groove being only slightly greater than that of the two folds fitted together; a fixing strip may be held in its groove by holding means which pass transversely through the partition at the level of the groove where the said fixing strip is located. In the case of the variant including a fastening means made up of a single expansion joint, this may be produced by inserting a part folded into an L of the weld flange of the said expansion joint into a groove with T-shaped cross-section made in an element of the secondary insulation barrier.

Advantageously, the compartments of the secondary insulating barrier press onto the bearing structure of the ship by means of wads of polymerizable resin, these wads reconstituting, by means of discontinuous elements, a defined geometric surface independent of the random discrepancies in the bearing structure in the static state with respect to its theoretical surface. A film of plastic is preferably interposed between the bearing structure and the wads of resin. The joint zones between the compartments of the secondary insulation barrier are preferably filled with an insulating material. The secondary insulating barrier is preferably under a reduced pressure lying between 0.1 and 300 millibar absolute.

Advantageously, the elements making up the primary insulating barrier are panels of cellular material; in this case and for the first variant defined previously in which the fastening means includes a batten, provision is made for the panels of cellular material which constitute the primary insulating barrier to be held with respect to the secondary watertightness barrier by virtue of angle brackets fixed to the battens of the fastening means, one of the wings of the said angle brackets being driven into the said panels in order to hold them. Preferably, the primary watertightness barrier is formed by metal strakes with edges turned up towards the inside of the tank, the said strakes being made up of thin plate with a low coefficient of expansion and being butt welded via their turned-up edges onto the two faces of the weld flange of an expansion joint held, directly or indirectly, by the secondary insulation barrier.

BRIEF DESCRIPTION OF THE DRAWINGS

In order to make the subject of the invention easier to understand, there will now be described, by way of purely illustrative and non-limiting examples, two embodiments thereof represented in the appended drawing. In this drawing:

FIG. 2 represents, in the same section plane as FIG. 1, the complete embodiment of a connecting ring, the primary and secondary barriers being represented complete on the double hull side whereas just the secondary barrier is represented on the double transverse bulkhead side;

FIGS. 3A and 3B represent, on a large scale, the details IIIA and IIIB of FIG. 1 respectively;

DETAILED DESCRIPTION OF VARIOUS AND PREFERRED EMBODIMENTS

Figure 1:
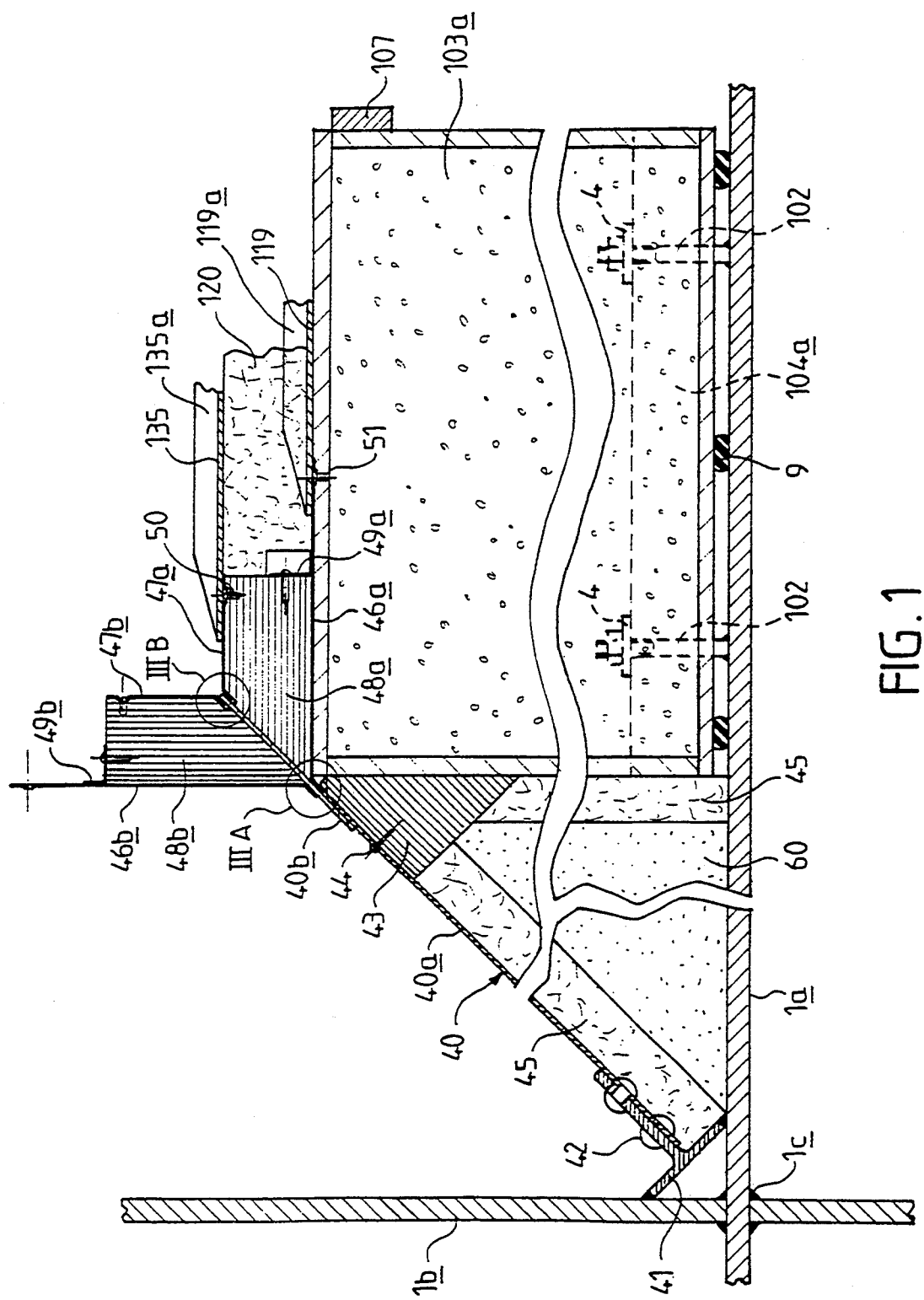
FIG. 1 represents a detailed section taken perpendicularly to an intersection ridge of the double hull of the ship with a double transverse bulkhead, this section representing complete primary and secondary barriers only for the part lying between the oblique band and the double hull, the part lying between the said band and the double transverse bulkhead featuring neither primary and secondary insulation barriers nor primary and secondary watertightness barriers.

Referring to the drawing, it can be seen that 1a has been used to denote the internal side of the double hull of a ship equipped with a tank according to the invention, and that 1b has been used to denote one of the sides of a double transverse bulkhead of the ship; assembly is performed by welding at the intersection ridge 1c of the double hull and of the double transverse bulkhead.

The tank according to the invention is made up of a secondary insulation barrier fastened to the bearing structure of the ship as has been indicated in French Patent Application 2 683 786, corresponding to U.S. Pat. No. 5,269,247, the teaching of which is incorporated here by way of reference. Retaining members made up of threaded studs 2 have therefore been welded onto the walls 1a or 1b of the bearing structure. These threaded studs are aligned in two perpendicular directions; in one of the directions, the studs are spaced apart by 500 mm, and in the other by 1260 mm. The studs 2 are used to fix compartments 3, which constitute the elements of the secondary insulation barrier of the tank according to the invention to the bearing structure of the ship. Each compartment 3 is made up of a parallelepipedal box made of plywood, having a width of 1 m, a length of 1.20 m, and a thickness of 0.43 m. Inside this box are located longitudinal partitions extending between the two rectangular long faces of the box; these internal partitions are parallel to the longitudinal edges of the compartment; the inside of the compartment is filled with a particular heat insulant material such as the one known under the name of "PERLITE". Each compartment includes, on the small side of one of its long rectangular lateral faces, a tenon 3a which projects with respect to the wall of the compartment and which is made up of a wooden lath having a rectangular cross-section; this tenon 3a is fixed to the compartment 3 by screws. When the compartments 3 are fitted against the bearing structure of the ship, the studs 2 are located between the two tenons 3a of two adjacent compartments 3, equidistant from the two ends of the tenons 3a. Two adjacent compartments 3 are fixed using one and the same stud by means of a washer 4 and a nut 5.

The compartment 3 is fitted to the bearing structure using the interposition of wads 9 of polymerizable resin; these wads are located on that one of the long faces of the compartment 3 which faces the bearing structure and the compartment is pressed towards the bearing structure until shims of predetermined dimensions, fixed at the four corners of the compartment 3, come to bear against the said bearing structure. In this position the wads of polymerizable resin 9 are crushed to a greater or lesser degree, and this technique makes it possible to take up any defects which the bearing structure exhibits in the static state with respect to its theoretical surface. The dimensioning of the shims is calculated after precise measurement of the spatial position of the internal face of the bearing structure. When this positioning of a compartment has been carried out, the compartment is fixed by virtue of the studs 2 and the polymerizable wads 9 cure in a few hours by means of polymerization, which makes it possible to remove the shims later. Before applying the compartment 3 against the bearing structure, a film of polyane is interposed between it and the wads 9 in order to prevent the resin of the wad from sticking to the bearing structure and in order thus to allow dynamic deformation of the bearing structure without the compartment 3 being subjected to the loads due to the said deformation between the retaining members 2. In line with the studs 2, the compartments 3 are separated by a joint zone of approximately 60 mm in width, which is filled by means of a thermal insulating material, as has previously been described in the state of the art.

In the upper face 3b of the compartments 3, that is to say in the one which is not facing the bearing structure, there has been made, in line with two internal partitions, a groove 15 extending over the entire length of the compartment, perpendicularly to the direction of the two tenons 3a. A fastening means is fitted into these grooves 15, allowing there to be held on the secondary insulation barrier made up of the compartments 3 on the one hand, a secondary watertightness barrier and, on the other hand, a primary watertightness barrier, the detailed structure of this fastening means being described later and being clearly visible, for a first variant, in FIG. 4 and, for a second variant, in FIG. 9.

Figure 4:
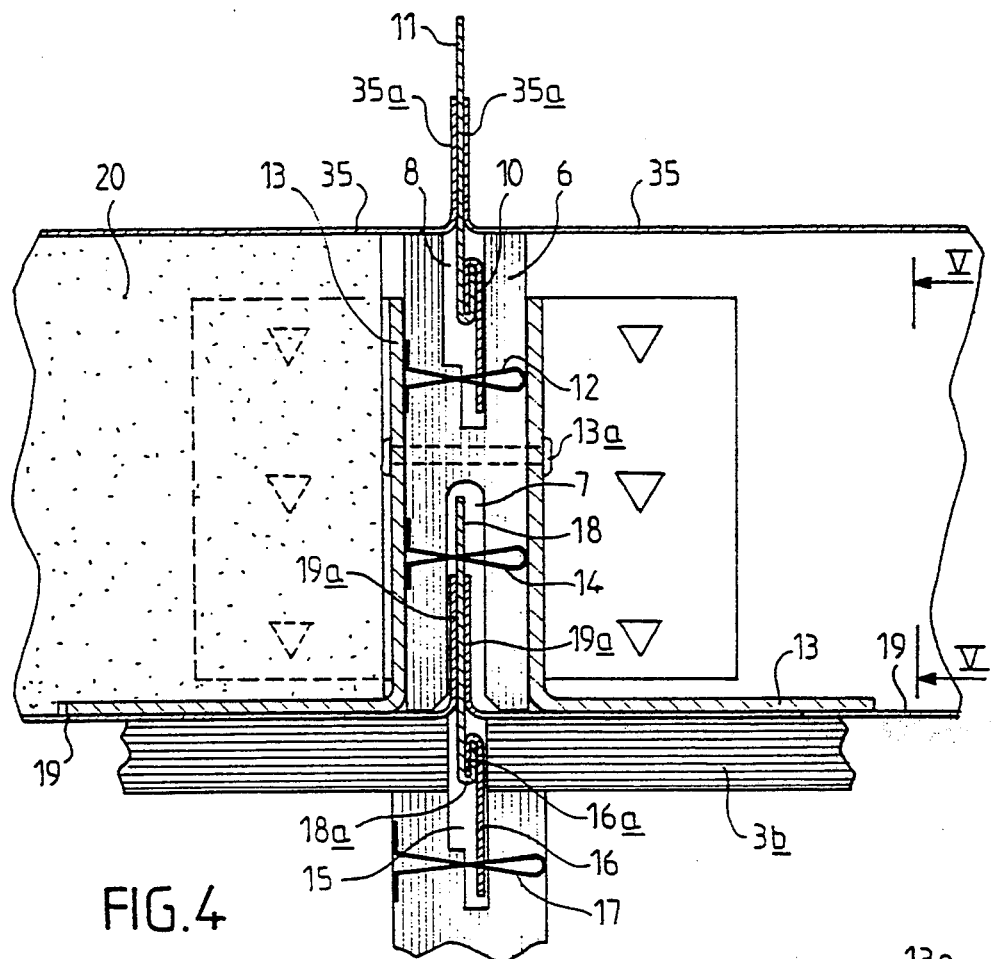
FIG. 4 represents a section on IV—IV of FIG. 2, the right-hand part of the primary insulating barrier being assumed to have been removed to make it easier to see a holding angle bracket.
Figure 5:
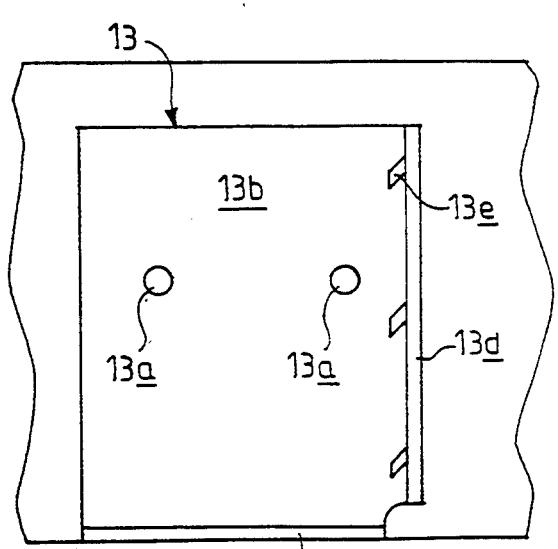
FIG. 5 represents a view on V—V of FIG. 4.
Figure 6:
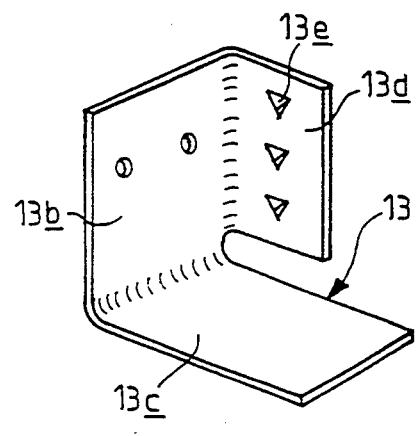
FIG. 6 represents a holding angle bracket viewed in perspective.
Figure 7:
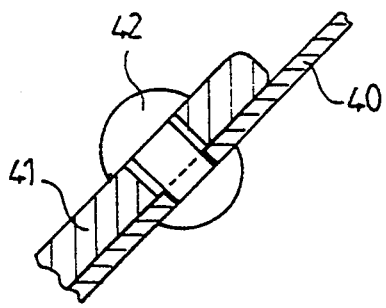
FIG. 7 represents in detail a rivet allowing the band to be mounted on the T-shaped strap close to the intersection ridge.

For the variant of FIG. 4, which corresponds to the embodiment represented in FIGS. 1 to 7, the fastening means comprises three parts: a first part is made up of a first expansion joint made up of a fixing strip 16 and of a weld flange 18, both produced from invar plate; the fixing strip 16 has a longitudinal edge folded over into a U in order to constitute a fold 16a and it is held inside the groove 15 by clips 17 located transversely; the weld flange 18 has an edge folded into a U in order to constitute a fold 18a; the two folds 16a and 18a are fitted into one another so that the weld flange 18 is held on the fixing strip 16 and, consequently, is secured to the compartments 3 of the secondary insulating barrier; the fixing strip 16 and the weld flange 18 are produced from invar plate 0.5 mm thick. The expansion joint thus made allows the weld flange 18 to slide with respect to the compartment 3 in the longitudinal direction of the compartment, that is to say parallel to the internal partitions of the compartment. In order to give the fastening 16/18 good strength, it is contrived for the width of the groove 15 to be only slightly greater than the overall thickness of the two folds 16a and 18a, which prevents the folds from opening up and increases the tensile load that the weld flange 18 can withstand. The second part of the fastening means is made up of a batten 6 made of plywood and located on edge in line with the expansion joint 16/18. The batten 6 includes, on its lower edge, that is to say the one which is close to the compartments 3, a rabbet 7 in which the weld flange 18 as well as the welded edges which are associated with it can be positioned, as will be described later. On its upper edge, the batten 6 includes a groove 8 in which a second expansion joint, completely identical to the first, made up of a fixing strip 10 and of a weld flange 11 is positioned; the fixing strip 10 is secured to the batten 6 by clips 12. This expansion joint 10/11 constitutes the third part of the fastening means; on either side of the weld flange 11 there are welded the turned-up edges of metal strakes, as will be described later.

When the secondary insulation barrier is made up by means of the compartments 3 as indicated above, the expansion joints 16/18 leave the weld flanges 18 visible projecting towards the inside of the tank. The secondary watertightness barrier is then fitted, which is formed of strakes 19 made of invar plate 0.7 mm thick, with turned-up edges 19a. These invar strakes 19 constitute strips which have a width of substantially 50 cm between two turned-up edges and which are welded by their turned-up edges on either side of the weld flanges 18. The turned-up edges 19a and weld flange 18 project above the surface made up of the strakes 19. Since the welds on the turned-up edges 19a are watertight, a secondary watertightness barrier is thus produced, pressed against the secondary insulation barrier.

With the secondary barrier thus formed, the battens 6 are fitted onto the weld flanges 18. These battens are equipped, on each of their long longitudinal faces, with holding angle brackets denoted by 13 overall. The angle brackets 13 are fixed symmetrically on either side of each batten 6 by means of rivets 13a. Each angle bracket 13 includes two branches, one 13b pressed against the batten 6 and the other 13c pressed against a strake 19 of the secondary watertightness barrier; the width of these branches is 50 mm and their length 60 mm. Each branch 13b includes a small anchoring plate 13d which is formed of a zone folded at right angles at the edge of the branch 13b; the small anchoring plate 13d therefore projects perpendicularly to the batten 6. The small anchoring plate 13d has a length slightly less than 60 mm in order to allow folding and in its central zone it has three dents causing the appearance of fastening teeth 13e, the pointed part of which is on the secondary watertightness barrier side.

When the battens 6 have been put in position on the secondary watertightness barrier, they are secured to the weld flanges 18 by clips 14 and they are supported laterally by the branches 13c of the holding angle brackets 13. Panels of polyurethane foam 20 having a thickness of 68 mm and coming exactly flush at the level of the upper edge of the battens 6 are then fitted between the battens 6. These panels are pushed between two adjacent battens until they come to bear against the strakes 19 of the secondary watertightness barrier and this thrust pushes the small fastening plates 13d, which behave like knives, into the panel; the fastening teeth 13e prevent the panel from detaching from the secondary barrier which supports it and make it possible to wait for the fitting of the primary watertightness barrier in order to hold it permanently. In order to constitute the primary watertightness barrier, strakes 35 made of invar plate including turned-up edges 35a and having a thickness of 0.5 mm are used. The width of the strakes 35 is approximately 50 cm, so that the turned-up edges 35a come on either side of a weld flange 11; continuous watertight welding between the edges 35a and the weld flange 11 can then be carried out in a known way by means of an automatic machine as was done previously for the edges 19a and the weld flange 18. The primary insulation barrier is thus permanently held.

It is preferable for the secondary insulation barrier to be placed under a reduced pressure, for example under an absolute pressure of 2 millibar. Taking its great thickness of 430 mm into account, the secondary insulation barrier therefore exhibits very high insulation characteristics. In order to establish the reduced pressure of 2 millibar, air is pumped into the secondary insulation layer; the compartments 3 may include orifices in their transverse edges, in order to facilitate the drawing of air into the compartments.

The production of the connecting ring which is going to be fitted between the tank wall which is along the double hull of the ship and the tank wall which is along a transverse bulkhead of the ship will now be described, these two tank walls being produced as indicated previously. The last compartment 3 of the secondary insulation barrier is at a distance from the intersection ridge 1c which is less than the length of a compartment 3. For each of the walls 1a and 1b there is therefore fitted a special compartment 103a and 103b respectively which includes, just like the compartments 3, tenons 104a and 104b respectively, allowing these special compartments to be fixed against the corresponding bearing structure wall by means of studs 102 identical to the studs 2 described previously. The tenons 104a, 104b are respectively perpendicular to the direction of the tenons 3a of the compartments 3 located along the corresponding bearing structure wall. For each special compartment 103a or 103b there are therefore two tenons 104a or 104b, which are spaced apart by the width of a compartment 3, that is to say by 1 meter. Each tenon 104a or 104b interacts with two studs 102 and two adjacent special compartments attributable to the same bearing structure wall exhibit two adjacent tenons which are held by the same two studs 102. The tenons 104a and 104b are fixed by the studs 102 in the same way as the tenons 3a are fixed by the studs 2, using washers 4 so that one and the same stud can act on two adjacent tenons. The special compartments 103a and 103b are fitted using wads of polymerizable resin 9, as was previously described for the compartments 3. Between the last compartment 3 of this corner connection and the special compartment 103a or 103b, a space 105a and 105b respectively has been left, which space is filled with glass wool and is closed on the secondary watertightness barrier side by a cover 106a and 106b respectively, the said cover bearing on laths 107 located projecting into the spaces 105a and 105b on the one hand, on the edge of the said last compartment 3 and, on the other hand, on the edge of the special compartments 103a and 103b on the inside of the tank.

Along the entire length of the intersection ridge 1c there is a residual space of square cross-section lying between the bearing structure walls 1a and 1b on the one hand, and the special compartments 103a and 103b on the other hand. In this residual space is located a band denoted overall by 40, this band being made of invar plate 3 mm thick located at 45° with respect to the two walls 1a and 1b. This band 40 is fastened to the bearing structure by a T-shaped strap 41 which includes a sole plate, welded at its two ends onto the bearing structure walls 1a and 1b, and a web to which the band 40 is fixed by rivets 42. 20-off 12 mm diameter rivets are provided per linear meter of assembly. The rivetting, represented in detail in FIG. 7, allows a translational movement of the band 40 of 4 mm with respect to the strap 41, given that the holes made in the web of the said strap for the passage of the rivets have a diameter of 16 mm. The opposite part of the band 40 from the strap 41 bears on a lath 43 of triangular cross-section carried along the edge of the special compartment 103a which is perpendicular to the tenon 104a and close to the inside of the tank. The band is fixed to this tenon by means of screws 44. The residual space on either side of the band 40 is filled with an insulating substance namely, on the one hand, close to the special compartments and close to the band 40, a layer of glass wool 45 and, on the other hand, in the remaining volume, a block 60 of polyurethane foam with a triangular cross-section.

In actual fact, the band denoted by 40 overall is made up of two parts: one, 40a which extends from the strap 41 up to the tenon 43 and the other, 40b, which is lap-welded to the previous one and extends up to the primary watertightness barrier. This second part 40b is welded to four plates 46a, 46b, 47a, 47b. The plates 46a, 46b come to bear respectively on the special compartments 103a, 103b; the plates 47a, 47b are level with the primary watertightness barrier and respectively parallel to the plates 46a, 46b. The four plates are bent so that their welds onto the band part 40b can be carried out flat; welding is done electrically by a device with an electrode wheel and the amperage is of the order of 8 to 9000 amperes in order to give a weld over a width greater than 1.5 mm. The plates 46a, 46b, 47a, 47b are invar plate 1.5 mm thick. In the space lying between the plates 46b and 47b, on the one hand, and the plates 46a and 47a, on the other hand, there are respectively fitted two shims 48b and 48a made of plywood. The plates 47a and 47b include, towards their edge furthest from the part 40b of the band 40, holes allowing countersunk screws to be fitted; these holes are obtained by deformation of the metal and the slight relief thus created towards the shims 48a, 48b is housed in the appropriate rabbet of the said shims. The dimensions of the shims 48a, 48b are such that these shims are exactly covered by the plates 46a, 47a, 46b, and 47b and they are held in position with respect to the said plates, for each shim, by virtue of a positioning angle bracket 49a, 49b which is fixed to the corresponding shim by screws and onto the plates 46a, 46b respectively by spot welds. When the shims 48a, 48b are fitted between the four plates 46a, 47a on the one hand and 46b, 47b, on the other hand, the oblique end of these shims comes to bear against the part 40b of the band 40; of course, in the zone of the weld with the plates 47a, 47b, the shims 48a, 48b exhibit rabbets 49 taking account of the existing overthickness (see FIG. 3B). In the same way, close to the welded connection of the plates 46a and 46b with the part 40b of the band 40, the corners of the shims 48a and 48b have been relieved, as is clearly visible in FIG. 3A.

The structure which has just been described makes it possible to produce a prefabricated element made up of the part 40b of the band 40, the plates 46a, 46b, 47a, 47b, the shims 48a, 48b and the angle brackets 49a, 49b. This prefabricated element is made up in lengths of three meters, the shims 48a, 48b nevertheless being in lengths of one metre located side by side in order to give the assembly a slight amount of flexibility. For assembly, the T-shaped strap 41 is fixed to the bearing structure of the ship, the special compartment 103a and the part 40a of the band are fitted, the insulation lying between the part 40a of the band and the special compartment 103a is fitted, the prefabricated element defined above is offered up and the part 40b of the band is welded to the part 40a of the band with an overlap of approximately 30 mm; a thermal insulation sheet is located level with this weld between the part 40b of the band and the tenon 43. Next, the special compartment 103b is fitted then the insulation in the part lying between this special compartment and the part 40b of the band.

In the prefabricated element described above, the plates 46a and 46b extend beyond the shims 48a and 48b respectively and, close to their edge furthest from the part 40a of the band, they include holes for the fitting of countersunk screws, these holes being produced like those which were described previously for the plates 47a and 47b; the reliefs caused by the deformation of these plates are located in appropriate rabbets made on the face of the special compartments 103a and 103b, which respectively support the plates 46a and 46b. The screws fitted into the holes in the plates 47a, 47b for fixing the shims 48a, 48b have been denoted by 50 and those fitted into the holes in the plates 46a, 46b for fixing these plates with respect to the special compartments 103a, 103b have been denoted by 51. Level with the plates 46a and 46b, the connection between the said plates and the strakes 19 takes place by means of intermediate strakes 119 with turned-up edges 119a which overlap the zone in which the screws 51 are located and which are welded in a watertight fashion to the plates 46a, 46b as well as to the strakes 19 of the secondary watertightness barrier. Continuity of the secondary watertightness barrier in the corner zone is thus ensured. Panels 120 of polyurethane foam similar to the panels 20 are then fitted on either side of the shims 48a and 48b so as to ensure continuity of the primary insulating barrier between the shims 48a, 48b and the wall panels 20. The continuity of the primary watertightness barrier is then ensured by fitting intermediate strakes 135 including turned-up edges 135a, the said intermediate strakes coming, on the one hand, to overlap the zone of the plates 47a and 47b in which the screws 50 are located and, on the other hand, to overlap the ends of the strakes 35 of the primary watertightness barrier of the walls constructed previously: continuity of the primary watertightness barrier is thereby ensured.

It is appropriate to note that the continuity of the primary and secondary watertightness barriers is provided by virtue of the fact that the welds between the plates 47a, 47b and the part 40b of the band, on the one hand, and between the plates 46a, 46b and the part 40b of the band, on the other hand, are watertight welds capable of resisting the very high tensile loads to which the watertightness barriers are subjected during the deformation of the ship in a heavy sea. For a ship transporting a cargo of 200,000 m$^3$, the tensile loads may reach 10 tons per linear meter in each watertightness barrier, so that the band 40 must be produced so that it can withstand tensile loads of approximately 20 tons per linear meter. It was mentioned that the welds produced with the amperages indicated previously are carried out over a width of approximately 2 mm at the interface of the plates to be welded, which is sufficient to withstand the abovementioned tensile load, in shear. The possibility of a deflection with respect to the strap 41 has been designed in for the band 40 in order to take account of the fact that the secondary barrier is likely to sag and that buckling of the band 40 is to be avoided.

It is noted that the embodiment of the connecting ring, which has just been described, is much simpler and much more economical than the one which was envisaged in French Patent Application 2 683 786, corresponding to U.S. Pat. No. 5,269,247. Furthermore, the thermal insulation characteristics are better than in the state of the art. As an added bonus, the assembly and fastening of the primary barrier is considerably simplified by comparison with the provisions envisaged in the state of the art because the holding of the primary watertightness barrier by virtue of a fastening means carried by the secondary insulation barrier constitutes a great simplification. This simplification is all the easier to implement if the primary insulation barrier is made up of prefabricated foam panels, which are relatively lightweight.

Figure 8:
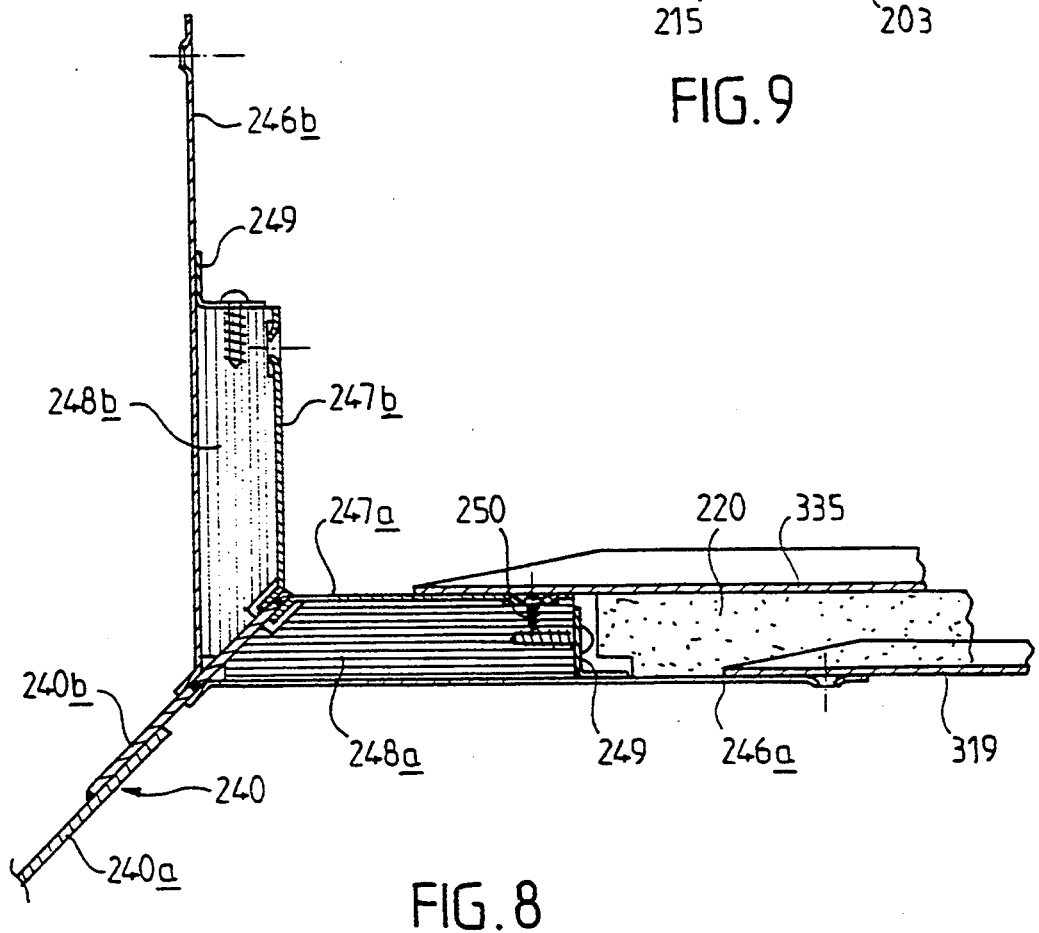
FIG. 8 represents, for a variant including a primary barrier of slight thickness, the embodiment of the connecting ring in a view similar to that of FIG. 1, but limited to the tank corner at the primary barrier, this primary barrier being fitted solely on the part which is parallel to the double hull.

In a variant of the invention, benefit is drawn from the fact that the embodiment described above for the connecting rings in the tank corners allows the welds made on the part 40b of the band 40 for joining to the plates 47a, 47b, on the one hand, and the plates 46a, 46b on the other hand, to be brought considerably closer together. This results in the fact that the thickness of the primary insulation barrier can be reduced considerably, which is extremely favourable given that if there is a leak in the primary watertightness barrier, the cold zone then created on the secondary watertightness barrier is further from the bearing structure of the ship for a constant total thickness of thermal insulation; the quality of the steel used for producing the bearing structure of the ship can thereby be reduced, and this results in a lower cost price of the ship; if a grade B steel is adopted, instead of a grade E steel, for example, for the internal wall of the double hull, then a saving of up to 2% on the total cost of the ship may be made. Furthermore, the fact that the thickness of the primary insulation barrier has been reduced makes it possible to dispense with providing expansion joints between the primary watertightness barrier and the secondary watertightness barrier, so that the strakes of the two watertightness barriers can be fixed to one and the same weld flange, a single expansion joint being provided between the said weld flange and the elements of the secondary insulation barrier; in order to withstand the stresses due to the differential deformations of the weld flange between the levels of the primary and secondary watertightness barriers, it is sufficient, owing to the small distance between the two aforementioned barriers, to reinforce slightly the thickness of the weld flanges associated with the said watertightness barriers so that a system is obtained which perfectly withstands the deformations of the bearing structure of the ship in a heavy sea. Such a variant embodiment is represented in FIGS. 8 to 9.

For this variant, the production of the secondary insulation barrier is identical to that which was described previously. The structure of the prefabricated element, which constitutes the tank corner level with the secondary watertightness barrier, the primary insulation barrier and the primary watertightness barrier is also identical to the one which was described previously, and the reference numerals which have been adopted are consequently the same ones increased by 200. The essential difference between the two variants stems from the thickness of the primary insulation barrier, which here is equal to 25 mm: this primary insulation barrier is made up of panels of polyurethane foam denoted by the reference 220. The panels 220 which are close to the shims 248a, 248b exhibit rabbets for housing the heads of screws associated with the angle brackets 249 and for housing the said angle brackets.

Figure 9:
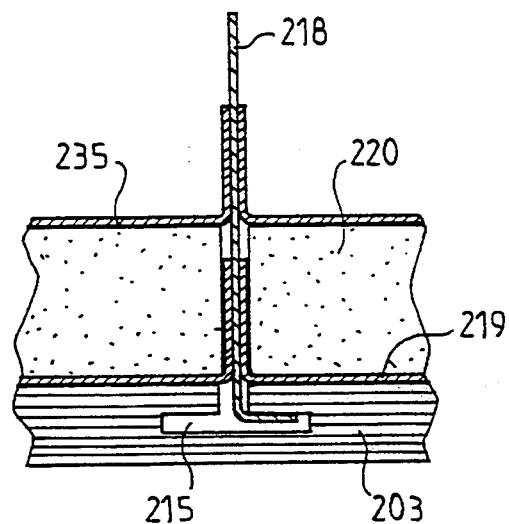
FIG. 9 represents a view similar to that of FIG. 4 in the case of a primary barrier of the type of that represented in FIG. 8.

FIG. 9 represents the variant for fixing the primary watertightness barrier, which can be adopted with a primary watertightness barrier 25 mm thick. The strakes of the primary and secondary watertightness barriers are the same as in the previous embodiment: they have been denoted respectively by 235 and 219. The grooves 15 which, in the first variant, were provided on the compartments of the secondary insulation barrier here have been replaced by grooves 215 which have a T-shaped cross-section. A weld flange 218 folded into an L slides in each groove 215, the small branch of the L being inserted into one branch of the T-shaped groove 215, while the long branch of the L emerges above the compartments of the secondary insulation barrier passing through the web of the T of the groove 215. The weld flange 218 is made up of invar plate 0.7 mm thick; this thickness makes it possible both to withstand the shear generated by the absence of an expansion joint between the two watertightness barriers and to act in opposition against the opening of the L-shaped fold, while the weld flange 218 holds the two watertightness barriers as explained later. The strakes 219 with turned-up edges which are placed on the compartments of the secondary insulation barrier are welded to turned-up edges on either side of the weld flange 218 in the same way as for the first variant. The panels 220 which constitute the primary insulation barrier are then fitted on either side of the weld flange 218, and the primary watertightness strakes 235 are placed on these panels, the turned-up edges of which strakes are welded on either side of the weld flange 218. In that way, the primary watertightness barrier is held directly by the secondary insulation barrier, by virtue of the weld flange 218.

It is clearly obvious that the simplicity of this assembly makes it possible to draw benefit from cost prices which are distinctly improved by comparison with that which was envisaged in the state of the art and this being all the more true if the fitting of an L-shaped expansion joint can be mechanized, which is not the case for the U-shaped expansion joints of the first variant.

I claim:

1. A watertight and thermally insulating tank built into the bearing structure of a ship, said bearing structure including walls substantially parallel to an axis of the ship and forming internal sides of a double hull of the ship and two transverse bulkheads substantially perpendicular to the axis of the ship, said tank comprising:

a primary watertight barrier contacting a product contained within said tank;

a secondary watertight barrier located between said primary watertight barrier and the bearing structure of the ship;

a primary thermal insulating barrier and a secondary thermal insulating barrier, said thermal insulating barriers being alternated with said watertight barriers;

fastening means for holding said primary thermal insulating barrier pressed against said secondary watertight barrier, said fastening means being substantially continuously in a straight line and being mechanically joined to said secondary thermal insulating barrier; and a corner connection for connecting elements of said primary and secondary watertight barriers at a corner of said tank in zones where the transverse bulkheads meet the internal sides of the double hull at an intersection ridge, a structure of said corner connection remaining substantially constant along an entire length of the intersection ridge, said corner connection securing said elements of said watertight barriers to opposite sides of a band along weld lines, said weld lines being substantially parallel, said band being oriented such that a mid-plane of said band passes substantially through said intersection ridge, said band being secured to the bearing structure in the vicinity of the intersection ridge.

2. A tank according to claim 1, further comprising four plates joined to said band, two of said plates being extensions of said primary watertight barriers of said corner, and two of said plates being extensions of said secondary watertight barriers of said corner, said plates being connected by welding to said primary and secondary watertight barriers by intermediate strakes when said corner connection is fitted.

3. A tank according to claim 2, further comprising insulating shims inserted between said plates joined to said band.

4. A tank according to claim 3, wherein said insulating shims are made of wood.

5. A tank according to claim 4, wherein said shims are held with respect to said plates by screws located in an overlap zone of said intermediate strakes.

6. A tank according claim 2, wherein said band comprises a first part and a second part, said parts being lap-welded together, and said second part being joined to said plates, and said first part being joined to the bearing structure of the ship.

7. A tank according to claim 6, wherein said second part of said band comprises a connection ring prefabricated element.

8. A tank according to claim 6, wherein said first part of said band is joined to the bearing structure by a T-shaped strap, said first part of said band is secured to said T-shaped strap by riveting, and said rivetting, under load, allows a translational movement of said first part of said band with respect to said T-shaped strap.

9. A tank according to claim 6, wherein said first part of said band is supported where it is welded to said second part of said band by a tenon carried by an adjacent element forming part of said secondary thermal insulating barrier, said first part of said band is secured to said tenon by screws.

10. A tank according to claim 1, wherein a volume on either side of said band between elements of said secondary thermal insulating barrier that are closest to said corner connection is filled with an insulating material.

11. A tank according to claim 1, wherein said primary thermal insulating barrier comprises substantially parallelepipedal elements between which said fastening means passes, said primary thermal insulating barrier is held pressed against said secondary watertight barrier by said primary watertight barrier, and said primary and secondary watertight barriers are secured to said fastening means in a watertight fashion.

12. A tank according to claim 11, wherein said fastening means comprises three parts:
   a first part comprises a first expansion joint held on an element of said secondary thermal insulating barrier, said first expansion joint includes a weld flange that projects with respect to a face of said secondary thermal insulating barrier that supports said secondary watertight barrier, said first expansion join also is capable of a translational movement with respect to the secondary thermal insulating barrier;
   a second part comprises a batten in a rabbet, said weld flange of said first joint is positioned in said rabbet, joining means secures said weld flange and said batten, said batten includes a groove on a face opposite a face that said rabbet emerges from; and
   a third part comprises a second expansion joint similar to said first expansion joint and fitted into said groove in said batten, a weld flange of said second expansion joint projects with respect to a face of said primary thermal insulating barrier that supports said primary watertight barrier, said weld flanges of said expansion joints allowing said primary and secondary watertight barriers, respectively, to be secured to said fastening means by welding.

13. A tank according to claim 12, wherein said primary watertight barrier comprises metal strakes, said strakes comprise a thin plate with a low coefficient of expansion, edges of said strakes are turned up toward an inside of said tank, and said turned-up edges are butt-welded onto faces of said weld flange of said second expansion joint held by said secondary thermal insulation barrier.

14. A tank according to claim 12, wherein said primary thermal insulating barrier comprises panels of cellular material, said panels are held with respect to the secondary watertight barrier by angle brackets fixed to said batten, said angle brackets including fastening teeth, one of said fastening teeth is driven into said panels in order to hold them.

15. A tank according to claim 11, wherein said primary thermal insulating barrier comprises insulating panels of slight thickness, and wherein said fastening means comprises a single expansion joint held on an element of said secondary thermal insulating barrier, said fastening means also comprising a weld flange projecting with respect to faces of said primary and secondary thermal insulating barriers that supports at least one of said primary and said secondary watertight barriers, and said weld flange permitting said primary and said secondary watertight barriers to be secured to said fastening means by welding.

16. A tank according to claim 15, wherein said secondary watertight barrier comprises metal strakes, edges of said strakes are turned up toward an inside of said tank, said strakes comprise a thin plate with a low coefficient of expansion, said turned-up edges of said strakes are butt-welded onto faces of said weld flange of said expansion joint held on said secondary thermal insulating barrier.

17. A tank according to claim 1, wherein said secondary thermal insulating barrier comprises substantially parallelepipedal elements fixed against the bearing structure of the ship by retaining members secured to the bearing structure, said elements are separated from each other by substantially straight joint zones, and said retaining members are located in said joint zones.

18. A tank according to claim 17, wherein:
   each of said retaining members includes a threaded stud, a base of said threaded stud is welded onto the bearing structure of the ship; and
   each of said retaining members also includes a nut that bears on a tenon secured to a compartment of said secondary thermal insulating barrier, said tenon is located along each edge of said compartment parallel to said joint zones in the vicinity of the bearing structure of the ship.

19. A tank according to claim 1, further comprising wads of polymerizable resin arranged between said secondary thermal insulating barrier and the bearing structure of the ship, said secondary thermal insulating barrier pressing onto said wads which press on the bearing structure, said wads comprising discontinuous elements comprising a defined geometric surface, said surface being independent of random discrepancies in the bearing structure in a static state with respect to its theoretical surface.

20. A tank according to claim 1, wherein said secondary thermal insulating barrier is under an absolute pressure of between 0.1 and 300 millibars.

21. A tank according to claim 1, wherein elements making up said primary thermal insulating barrier comprise panels of a cellular material.

* * * * *

UNITED STATES PATENT AND TRADEMARK OFFICE
CERTIFICATE OF CORRECTION

PATENT NO. : 5,450,806
DATED : September 19, 1995
INVENTOR(S) : JEAN

It is certified that error appears in the above-identified patent and that said Letters Patent is hereby corrected as shown below:

Drawings:

Figure 8, change the reference numeral "335" to --235--.

Signed and Sealed this

Ninth Day of April, 1996

Attest:

BRUCE LEHMAN

Attesting Officer

Commissioner of Patents and Trademarks